(No Model.)
G. BURDICK.
BICYCLE WHEEL HUB.
No. 593,764. Patented Nov. 16, 1897.
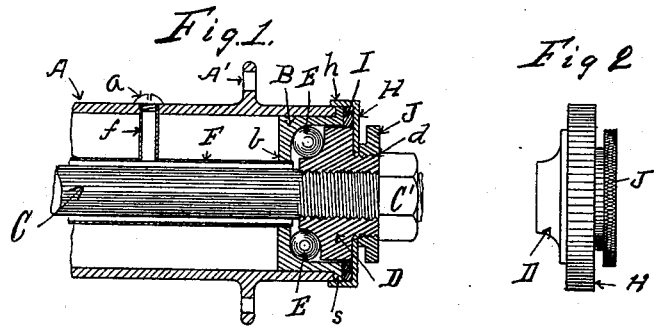
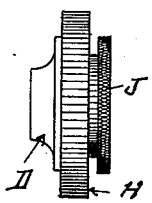
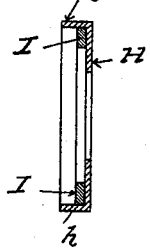
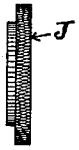
WITNESSES:
Fred Einfeldt
A. L. Jackson
INVENTOR
George Burdick
BY J. H. Sturgeon
ATTORNEY

UNITED STATES PATENT OFFICE.

GEORGE BURDICK, OF ERIE, PENNSYLVANIA, ASSIGNOR TO THE PENN MANUFACTURING COMPANY, OF SAME PLACE.

BICYCLE-WHEEL HUB.

SPECIFICATION forming part of Letters Patent No. 593,764, dated November 16, 1897.

Application filed September 4, 1896. Serial No. 604,828. (No model.)

*To all whom it may concern:*

Be it known that I, GEORGE BURDICK, a citizen of the United States, residing at the city of Erie, in the county of Erie and State of Pennsylvania, have invented certain new and useful Improvements in Bicycle-Wheel Hubs; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in bicycle-wheel hubs; and it consists in the novel construction and combination of the parts hereinafter fully described and claimed.

In the drawings, Figure 1 is a longitudinal section of a portion of a bicycle-wheel hub embodying my invention. Fig. 2 is a view in elevation of the cone, dust-cap, and lock-nut thereof. Fig. 3 is a vertical section of my improved dust-cap. Fig. 4 is a side view in elevation of the lock-nut therefor.

In the drawings, A is a section of the shell of a bicycle-wheel hub; B, the ball-cup in the end thereof. The ball-cup B is provided with a flange $s$, which bears against the end of the shell A.

C is the shaft.

D is the ball-cone, and E are the balls upon which the wheel-hub turns.

Surrounding the shaft C there is a tube F, which extends into the openings $b$ in the inner ends of ball-cup B, surrounding the shaft, where it is closely fitted, so as to form a tight joint therewith, and through the shell of the hub A, preferably at or near the center thereof, is a tube $f$, which extends into the tube F, the outer end of which is closed by means of a screw $a$ or other convenient device, by means of which tube $f$ oil may be supplied to the central tube F, along which it flows toward the ends thereof and passes into the cup B, so as to lubricate the balls E therein.

The cone D is made so that it projects a short distance beyond the outer end of the cup B, and on the outer end thereof is formed a short screw-threaded projection $d$. Over the end of the cone D is placed a thin cap H, Fig. 3, provided with an annular flange $h$, adapted to extend over the end of the cup B, and in this cap H, I place an annular washer or ring I, of felt or other suitable material, of sufficient thickness and width to fill the annular space between the end of the cup B and the cap H, so that the inner face of the felt ring I bears upon the projecting end of the cone and the outer face thereof bears upon the end of the cup B, thus completely closing every avenue through which dust could enter the bearing, the cap H, together with the packing-ring I therein, being secured in place against the end of the cone D by means of a milled thumb-nut J, Fig. 4, screwed upon the screw-threaded end $d$ of the cone D, so that it is held firmly in place thereon.

Having thus fully described my invention, so as to enable others to construct and use the same, what I claim as new, and desire to secure by Letters Patent of the United States, is—

The combination, with a shaft, and a shell or hub A concentric with the said shaft, of a ball-cup B inserted in one end of the said shell and provided with a flange $s$ bearing against the end of the shell, a ball-cone D secured on the end portion of the said shaft and provided with a screw-threaded projection $d$, a washer of soft material encircling the said cone and bearing against the end of the ball-cup, a cap H having a flange $h$ encircling the said flange $s$ and the washer, a nut J screwed on the projection $d$ and holding the said cap in position, balls between the said cup and cone, and an oil-tube F encircling the said shaft and secured into the ball-cup, substantially as set forth.

In testimony whereof I affix my signature in presence of two witnesses.

GEORGE BURDICK.

Witnesses:
 FRED EINFELDT,
 H. J. CURTZE.